United States Patent [19]

Laflin et al.

[11] Patent Number: 5,234,752

[45] Date of Patent: Aug. 10, 1993

[54] WEAR-RESISTANT LAMINATED ARTICLES

[75] Inventors: Philip Laflin, Manchester; John E. Kerwin, Knutsford; Geoffrey Colley, Worsley; David R. Newton, Manchester, all of United Kingdom

[73] Assignee: Tenmat Limited, Manchester, England

[21] Appl. No.: 768,844

[22] PCT Filed: Apr. 20, 1990

[86] PCT No.: PCT/GB90/00614

§ 371 Date: Oct. 1, 1991

§ 102(e) Date: Oct. 1, 1991

[87] PCT Pub. No.: WO90/13592

PCT Pub. Date: Nov. 15, 1990

[30] Foreign Application Priority Data

Apr. 28, 1989 [GB] United Kingdom ............... 8909787
Feb. 21, 1990 [GB] United Kingdom ............... 8993873

[51] Int. Cl.$^5$ .................. B32B 17/04; D03D 15/00; D02G 3/38

[52] U.S. Cl. .................. 428/251; 57/229; 428/246; 428/252; 428/257; 428/258; 428/259; 428/260; 428/272; 428/273; 428/284; 428/285; 428/286; 428/289; 428/290; 428/298; 428/302; 428/373; 428/375; 428/377; 428/408; 428/902; 428/908.8

[58] Field of Search ............... 57/229; 428/377, 246, 428/408, 259, 373, 257, 258, 284, 289, 290, 375, 908.8, 251, 252, 260, 272, 273, 285, 286, 289, 298, 302, 902

[56] References Cited

U.S. PATENT DOCUMENTS

| 4,446,191 | 5/1984 | Miyadera et al. | 428/246 |
| 4,548,678 | 10/1985 | Laflin et al. | 428/408 |
| 4,927,698 | 5/1990 | Jaco et al. | 428/373 |
| 4,967,548 | 11/1990 | Fangaet et al. | 428/372 |

FOREIGN PATENT DOCUMENTS

| 0050855 | 5/1982 | European Pat. Off. |
| 788793 | 11/1954 | United Kingdom . |
| 2121844A | 1/1984 | United Kingdom . |

Primary Examiner—George F. Lesmes
Assistant Examiner—James D. Withers
Attorney, Agent, or Firm—Nixon & Vanderhye

[57] ABSTRACT

In a wear-resistant laminated article (e.g. a bearing, or a compressor rotor blade) made by heating an assembly of superimposed layers of fabric impregnated with a phenolic or other thermosetting resin, the fabric is made of non-asbestos yarn comprising a core of glass fibre with a surface of aramid fibre and a relatively porous fibre such as viscose fibre, the aramid fibre forming not more than 40% by weight of the yarn. The laminate may further incorporate carbon fibres.

12 Claims, No Drawings

WEAR-RESISTANT LAMINATED ARTICLES

This invention relates to wear-resistant laminated articles, such as bearings, and rotor blades for pumps and compressors.

Well-known articles of this kind are made by heating an assembly of superimposed layers of cloth made of asbestos yarn and impregnated with a thermosetting resin.

The present invention is concerned with avoiding the use of asbestos.

It is already known (see for example GB-A-2 121 844) to make wear-resistant laminated articles using, instead of resin- impregnated asbestos cloth, heat-resistant aramid fibres, that is to say fibres of poly(aromatic amide), or glass fibres, made with an organic binder into flexible sheet material by a paper-making process, the sheet being then impregnated with resin. However, to obtain articles capable of sustained operation above 175° C., and in particular at temperatures up to 200°, there has to be used a proportion of aramid fibre which makes the product too expensive. If glass fibre is used instead of aramid fibre, the article is extremely abrasive.

According to the present invention there is provided a wear-resistant laminated article made by heating an assembly of superimposed layers of fabric impregnated with thermosetting resin, in which the fabric is made of non-asbestos yarn comprising a core of glass fibre with a surface of aramid fibre and a relatively porous fibre, the aramid fibre forming not more than 40% by weight of said yarn.

Fabric made of such non-asbestos yarn is commercially available as thermal insulation and packing, the relatively porous fibre therein being viscose. The function of the viscose fibre in the practice of the present invention is to assist impregnation with thermosetting resin of the fabric of glass core fibre/aramid surface fibre. The fabric is preferably woven, but may be of knitted construction.

The aramid fibre employed can be all of the para-form, such as that sold under the trade mark KEVLAR, but up to half of the aramid can if desired by contributed by meta-form such as poly(m-phenylene-iso-phthalamide).

A preferred composition of the yarn is
Glass fibre: 50-75, particularly 50-70%
Aramid fibre: 5-35, particularly 15-35%
Viscose fibre: 5-25, particularly 10-25%
these proportions being by weight of the yarn. It is further preferred that the fabric should have a weight per unit area in the range 550-900 grams/m$^2$.

A friction modifier such as graphite, polytetrafluoroethylene or molybdenum disulphide at levels from 2 to 20% by dry weight of the thermosetting resin may if desired be included to improve the wear-resistance of the product.

Suitable thermosetting resins are phenolic resins, such as phenol-formaldehyde resins derived from phenol itself or a hydrocarbon-substituted phenol.

For certain applications such as very heavy duty compressor blades, the novel wear-resistant articles described above may lack sufficient stiffness.

To remedy this, carbon fibres may be incorporated into the laminate. This may be accomplished by interleaving the fabric layers with layers of a carbon fibre resin pre-preg material, prior to lamination into an article. The carbon fibre may be in the form of a woven cloth or a non-woven felt, although the former is preferred. The resin is preferably the same as the resin used to impregnate the fabric, a phenolic resin being particularly preferred. The carbon fibre content may be in the range of from 5 to 30% by weight, more preferably in the range 10 to 25% by weight.

The phenolic resin may contain from 2-10% by weight of an epoxy resin material, together with a hardener for the latter, in order to promote adhesion to the carbon fibres. An epoxy resin content of about 5% by weight is particularly preferred.

The carbon fibres may also be blended into the fabric as an integral component thereof. For example, a carbon fibre weft may be used in making the fabric. In some circumstances, this latter approach may be preferable to incorporation immediately prior to lamination because it results in a more uniform distribution of the carbon fibre reinforcement.

The invention is further illustrated by the following Example.

EXAMPLE ONE

A plain weave cloth of nominal thickness 2 mm, weight per unit area 620 grams/m$^2$, and a construction of 80 ends per dm and 36 picks per dm, of the kind sold for protection against splashed molten metal, was impregnated with a solution (50% by weight solids content) in mixed ethanol/methanol/water (86% ethanol, 4% methanol by weight) of a conventional phenol-formaldehyde resol sold by British Petroleum Chemicals Limited under the trade mark CELLOBOND. The cloth itself was woven from glass-core yarn (E-glass fibre), with aramid fibre and viscose wrapped round the glass core. Total composition was: glass, 54%, aramid, 34%; viscose, 12%.

Excess resin solution was squeezed from the impregnated cloth by passing it between rollers, and the sheet was then heated at 135° for 20 minutes to remove solvent present in the retained resin solution and to part-cure the resin.

Sheet Laminate

From the material obtained as described above 8 pieces measuring 300×300 mm were cut. The 8 pieces were superimposed one upon another (with the weft of adjacent pieces at right angles). The assembly was then cured at 150° C. in a steam-press (pressure 7.7 MPa; time 45 mins) and then post-cured at 150° C. in air.

The laminate thus formed is readily machinable to form pump or compressor rotor blades. Its properties are given later in this specification.

Tubular Laminate

The part-cured cloth was wrapped onto a heated mandrel (100° C.) of diameter 20 mm, and the tubular laminate produced was compression moulded and then baked in an oven at 150° C. to cure the resin fully.

The tubular laminate is readily converted into the form of bushes. The properties of the tube and of bushes machined from it are given later in this specification.

Sheet Properties

| PHYSICAL PROPERTY | Material according to the invention | Known asbestos laminate |
| --- | --- | --- |
| Room temperature flexural strength | 140 MPa | 97 MPa |

| PHYSICAL PROPERTY | Material according to the invention | Known asbestos laminate |
| --- | --- | --- |
| Flexural strength at 200° C. following 4 days aging at 200° C. | 115 MPa | 70 MPa |
| Flexural strength at 200° C. following 10 days aging at 200° C. | 90 MPa | 60 MPa |
| Compressive strength | 255 MPa | 312 MPa |
| Tensile strength | 92 MPa | 67 MPa |
| Notched Charpy impact strength | 46 KJ/m$^2$ | 20 KJ/m$^2$ |
| Density | 1.52 gram per c | 1.73 gram per cc |
| Shear strength | 107 MPa | 93 MPa |
| Bond strength | 5.3 KN | 5.5 KN |
| Water absorption at 6.35 mm thickness | 600 mg | 170 mg |
| Linear coefficient of thermal expansion per °C. | 18 × 10$^{-6}$ | 13.5 × 10$^{-6}$ |
| Flexural modulus | 6.72 GPa | 13 GPa |

These physical properties, especially the flexural strength and thermal expansion, show the material to be particularly suitable for use in rotor blades, for example in a rotary compressor.

The material of the invention showed dimensional stability in oil similar to that of the asbestos laminate: both materials shrank in length by 0.05% when soaked in hot oil at 125° C. for 24 hours.

Comparative wear tests were carried out using equipment designed by the National Centre of Tribology and manufactured by Chloride Ferostatics. In this the test sample is in the form of a pin which is held under a fixed load against a rotating counter-face sleeve mounted on a shaft. Lubricated conditions were simulated by using test samples previously soaked in oil for 72 hours. The wear of the samples was assessed by measuring the width of the resulting scar damage. The material of the invention and the asbestos laminate were tested under identical conditions and both yielded scars 3 mm wide. (A laminate consisting of a cloth of 100% glass fibre impregnated with phenolic resin gave a scar of 11 mm).

Tube Properties

| PHYSICAL PROPERTY | Material according to the invention | Known asbsetos laminate |
| --- | --- | --- |
| Density | 1.52 g per cc | 1.66 g per cc |
| Compressive strength | 225 MPa | 280 MPa |
| Axial coefficient of linear expansion per °C. | 12.8 × 10$^{-6}$ | 11.7 × 10$^{-6}$ |

The following investigations of friction and wear were run dry without external lubrication.

Scar Wear

The sample in the form of a strip is held against a rotating shaft of EN32 case-hardened steel under a fixed load for 100 hours continuously, and the width of the resulting scar damage is measured. The following results were obtained:

| Material | Scar wear (mm) |
| --- | --- |
| 1. According to the invention | 9.5 |
| 2. Asbestos laminate | 14.3 |
| 3. 1 additionally containing graphite (10% by weight) | 6.2 |
| 4. 2 additionally containing graphite (10% by weight) | 9.8 |

Friction Velocity Test

This uses a reciprocating rig in which a loaded sample slides horizontally against a mild steel counterface. Both load and reciprocating speed can be varied. The frictional force is measured using a load cell sensor. The results given below compare the frictional behaviour of the material of the invention with that of an asbestos laminate under a load of 5 kg.

| | Friction coefficient | |
| --- | --- | --- |
| Velocity (cm per min) | Material according to the invention | Known asbestos laminate |
| 0.2 | .42 | .46 |
| 0.8 | .41 | .54 |
| 1.5 | .43 | .60 |
| 3 | .44 | .64 |
| 6 | .49 | .66 |
| 12 | .47 | .75 |
| 24 | .46 | .68 |
| 32 | .51 | .66 |

Pressure Velocity (PV) Test

In this, housed machined bushes are run against a shaft at varying speeds over a range of pressures. A particular test would be carried out at constant speed with the load being progressively increased. At each load the temperature of the bush is monitored. Once this temperature has reached a maximum value, the load is increased and so on until the bush fails mechanically. A limiting PV value can be calculated. Bushes were prepared from the material of the invention and from the asbestos laminate and tested; results are shown below.

| | Limiting PV value (kg/cm$^2$ × m/min) | |
| --- | --- | --- |
| Speed (meters per min) | Material according to the invention | Known asbestos laminate |
| 20 | 350 | 235 |
| 60 | 470 | 350 |

The friction and wear test results given above show the material of the invention to be a useful high temperature bearing material, suitable for the replacement of bearings currently manufactured from asbestos yarn.

EXAMPLE TWO

To illustrate the effect of the inclusion of carbon fibres, the procedure described earlier in relation to Example one was repeated, with the addition of the step of interposing between each layer of the stack of pieces, a ply of a square weave carbon fibre fabric of weight 836 gm/m$^2$ woven from 20000 filament tows of 100% PAN-based carbon fibres. This fabric had been previously impregnated with a similar phenolic resin solution but in this case containing about 5% by weight of an epoxy resin comprising diglycidyl ether of bisphenol A and a minor amount of an amine hardener. This was subjected to a preliminary partial curing treatment prior to use. A similar ply was applied to each face of the stack and the whole press-cured as before. The carbon fibre content of the product was about 16% by weight.

On testing the modified laminate of this Example, the physical properties were found to be improved in certain respects over those of Example one, as follows:

| | |
|---|---|
| Room temperature flexural strength | 175 MPa |
| Flexural strength at 200° C. after 4 days aging at 200° C. | 140 MPa |
| Flexural modulus | 15 GPa |
| Bond strength | 5 KN |
| Linear coefficient of thermal expansion per °C. | $11.34 \times 10^{-6}$ |

EXAMPLE THREE

The procedure of the first example was followed, but this time using a cloth in which the weft yarn also included a carbon fibre component. Pieces were cut from the cloth and made into a laminate which was then press-cured. The product had significantly better properties than Example one, but in this case, the carbon fibre component was more uniformly distributed throughout the product.

EXAMPLE FOUR

Example two above was repeated using plies of non-woven carbon fibre tisse instead of woven fabric, the pre-treatment with resin remaining as before. The product had better properties than Example one, but was not quite as good as Example two.

The improved physical properties, especially the flexural strength and thermal expansion, show the carbon fibre modified material to be particularly suitable for use as rotor blades, particularly for use in heavy duty applications such as in certain kinds of rotary compressor.

We claim:

1. A wear-resistant laminated material made by heating an assembly of superimposed woven or knitted fabric impregnated with a thermosetting resin, wherein the fabric is made of non-asbestos yarn comprising a core of glass fiber with a surface of aramid fiber and viscose fiber, the yarn containing by weight 50 to 75% glass fiber, 5 to 35% aramid fiber and 5 to 25% viscose fiber.

2. The material according to claim 1, wherein the yarn comprises by weight 50 to 70% glass fibers, 15-35% aramid fibers and 10-25% viscose fiber.

3. The material according to claim 1, wherein the resin is a phenolic resin.

4. A rotor blade made of the material of claim 1.

5. A bearing made of the material of claim 1.

6. A wear-resistant laminated material made by heating an assembly of superimposed woven or knitted fabric impregnated with a thermosetting resin, wherein the fabric is made of a non-asbestos yarn having a core of glass fiber and a surface of aramid fiber and viscose fiber, the yarn containing by weight 50 to 75% glass fiber, 5 to 35% aramid fiber and 5 to 25% viscose fiber, and the material also contains 5 to 30% by weight carbon fibers.

7. The material according to claim 6, wherein said carbon fiber is in the form of cloth or non-woven tissue layer impregnated with resin interleaved with the superimposed fabric layers.

8. The material according to claim 6, in which the carbon fibers are woven into the fabric as an integral component thereof.

9. The material according to claim 7, wherein the resin of the carbon fiber layer is the same as that used to impregnate the fabric.

10. The material according to claim 7, wherein the resin of the carbon fiber layer is a phenolic resin and contains from 2–10% by weight of an epoxy resin, together with hardener therefor.

11. The material according to claim 10, wherein the resin contains about 5% by weight epoxy resin.

12. A rotor blade made of the material of claim 6.

* * * * *